United States Patent
Ogawa

(10) Patent No.: US 8,085,747 B2
(45) Date of Patent: Dec. 27, 2011

(54) RADIO BASE STATION AND CELL-IDENTIFIER SPECIFYING METHOD

(75) Inventor: Koji Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/960,595

(22) Filed: Dec. 6, 2010

(65) Prior Publication Data

US 2011/0143812 A1    Jun. 16, 2011

(30) Foreign Application Priority Data

Dec. 10, 2009 (JP) ................................. 2009-280397

(51) Int. Cl.
*H04Q 7/24* (2006.01)

(52) U.S. Cl. ........ 370/338; 370/310; 370/329; 455/561; 455/437

(58) Field of Classification Search .................. 370/310, 370/329, 328, 406, 338; 455/437, 561, 550.1
See application file for complete search history.

(56) References Cited

U.S. PATENT DOCUMENTS

2007/0280174 A1*  12/2007  Pun ............................... 370/338
2010/0234028 A1*   9/2010  Narasimha et al. ........... 455/437

FOREIGN PATENT DOCUMENTS

JP         11-64014 A       3/1999

* cited by examiner

*Primary Examiner* — Phuoc Doan

(57) ABSTRACT

A radio base station includes a first obtaining device to obtain position information for locating a position of a local station; a second obtaining device to obtain a matrix that includes blocks, each block representing an area with which a uniquely identifiable cell identifier is associated, and that covers a cell coverage of the local station and a cell coverage in which use of the same cell identifiers as those of the local station is to be avoided; and a specifying device to specify the cell identifiers associated with the blocks included in the cell coverage of the local station, on a basis of the local station position located by the position information and the matrix.

14 Claims, 13 Drawing Sheets

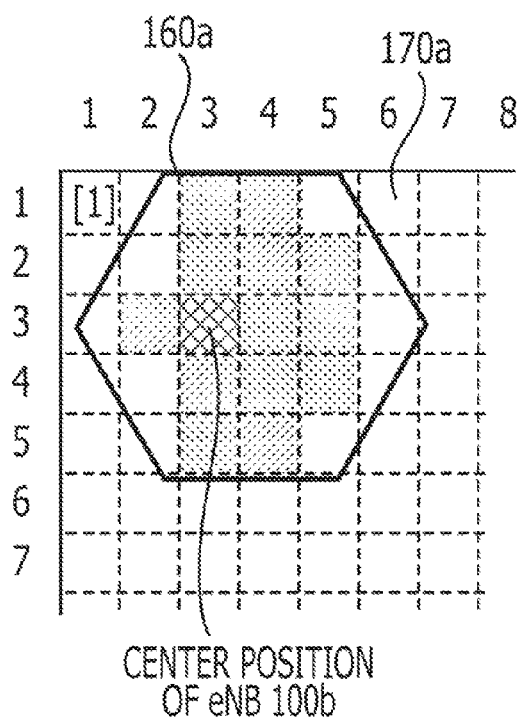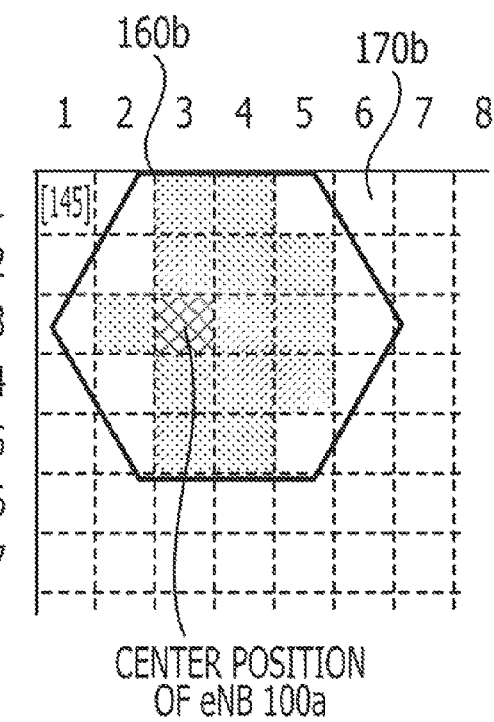

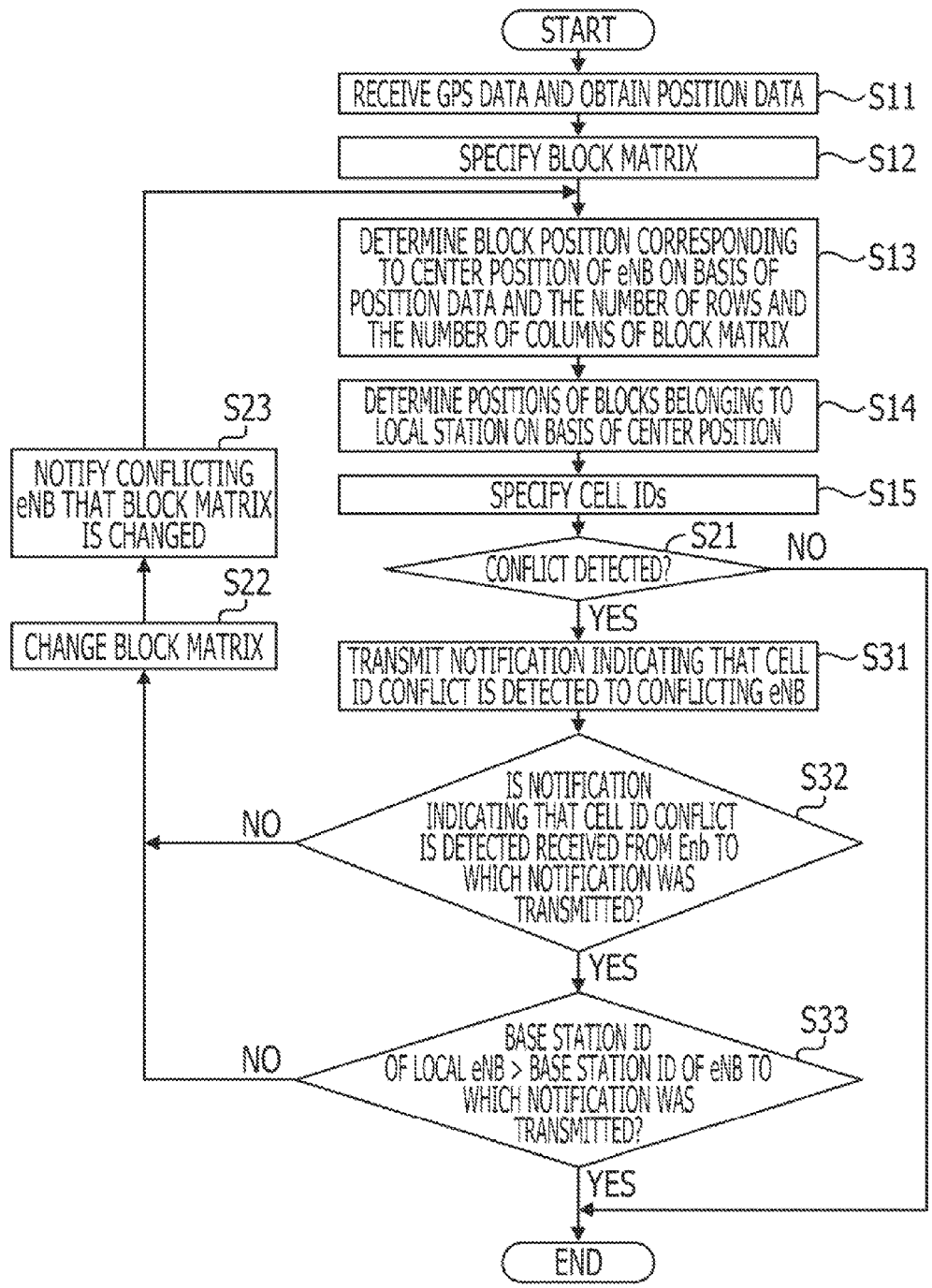

RADIO BASE STATION AND CELL-IDENTIFIER SPECIFYING METHOD

This application is based upon and claims the benefit of priority of the prior Japanese Patent Application No. 2009-280397, filed on Dec. 10, 2009, the entire contents of which are incorporated herein by reference.

FIELD

The present invention relates to a radio base station and a method of specifying cell identifiers.

BACKGROUND

In radio communication systems such as mobile phone systems, radio base stations (evolved Node B (eNB)) communicate with mobile terminals (user equipment (UE)) located in cells covered by the radio base stations. Each radio base station is assigned a unique cell identifier that is different from the cell identifier of an adjacent or nearby radio base station so that the mobile terminals can identify the cell covered by the radio base station. For example, when a first radio base station is assigned a first cell identifier, a second radio base station that is adjacent or near the first radio base station is assigned a second cell identifier that is different from the first cell identifier. Alternatively, when a first radio base station is assigned a first cell identifier, a second radio base station that does not have a cell overlapping a cell covered by the first radio base station (i.e., that is distant from the first radio base station) may be assigned the first cell identifier or may be assigned a second cell identifier that is different from the first cell identifier. Thus, each mobile terminal uses the cell identifier to identify the radio base station with which it is to communicate and transmits/receives data to/from the identified radio base station.

Examples of related art include Japanese Unexamined Patent Application Publication No. 11-64014.

An operator who installs or maintains the radio base stations manually assigns the cell identifiers to the radio base stations so that the same cell identifier is not redundantly assigned to adjacent or nearby ones of the radio base stations, that is, so that the cell identifiers do not conflict with each other between adjacent or nearby ones of the radio base stations. More specifically, the operator manually assigns the cell identifiers to the radio base stations, considering various factors, such as the locations where the radio base stations are installed, cell coverages (or cell radii) covered by the radio base stations, the presence/absence of obstacles to radio waves emitted from the radio base stations, and results of actual field evaluation. Thus, costs (e.g., temporal cost, expense cost, and operational cost) for assigning the cell identifiers to the radio base stations increase significantly.

SUMMARY

According to an aspect of an embodiment, a radio base station includes a first obtaining device to obtain position information for locating a position of a local station; a second obtaining device to obtain a matrix that includes blocks, each block representing an area with which a uniquely identifiable cell identifier is associated, and that covers a cell coverage of the local station and a cell coverage in which use of the same cell identifiers as those of the local station is to be avoided; and a specifying device to specify the cell identifiers associated with the blocks included in the cell coverage of the local station, on a basis of the local station position located by the position information and the matrix.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 11A to 11C are plan views each illustrating, in the block matrix, a specific cell-ID specifying operation according to the first operation example; and FIG. 12 is a flowchart illustrating a flow of a second operation example of an eNB included in the radio communication system according to the second embodiment.

DESCRIPTION OF EMBODIMENTS

Figure 1:
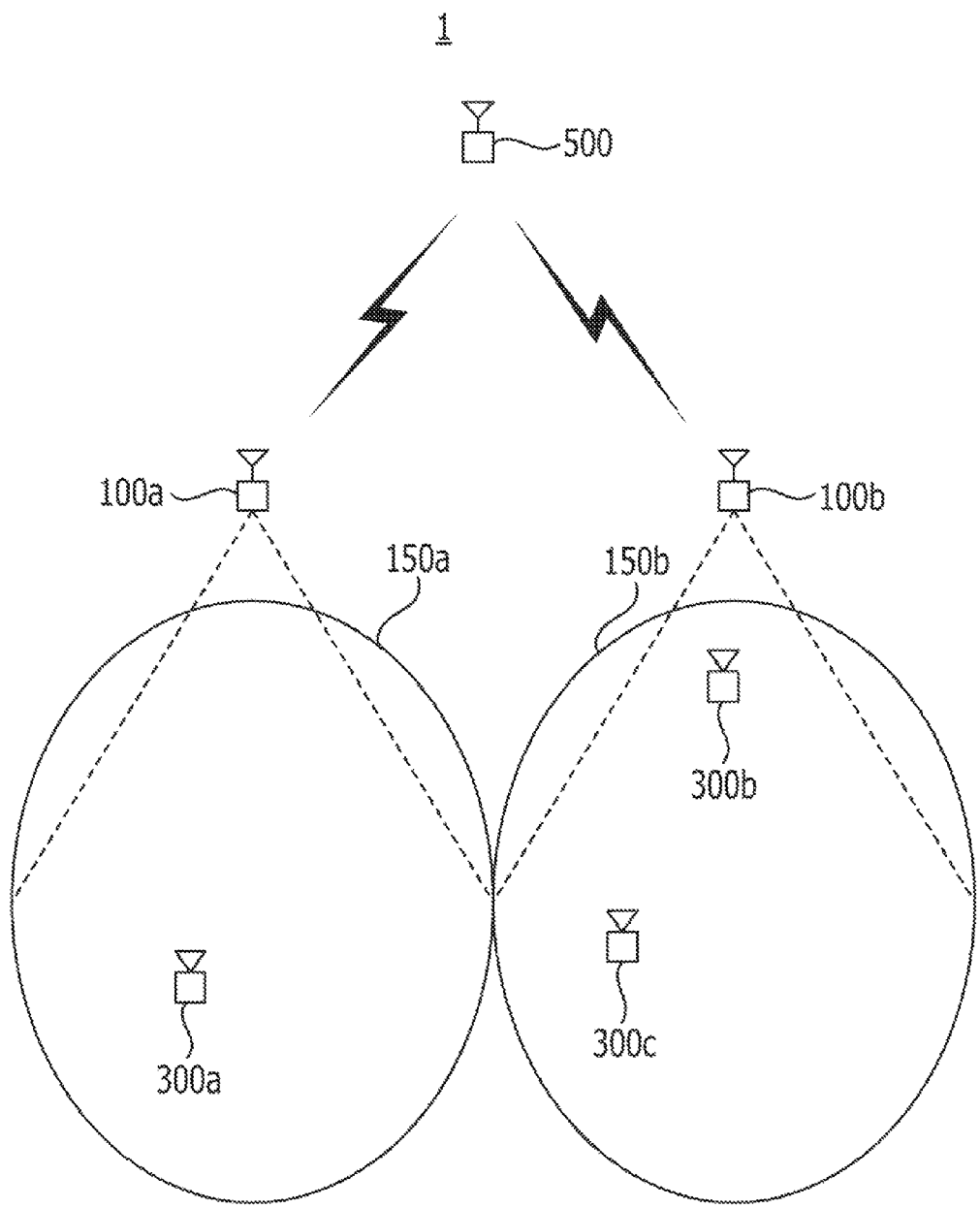
FIG. 1 illustrates a basic configuration of a radio communication system according to a first embodiment.

An object of the present invention is to provide, for example, a radio base station that can relatively easily specify cell identifiers that are different from those of another radio base station and a method for identifying such cell identifiers.

The object can be realized by a radio base station that includes a first obtaining device, second obtaining device, and specifying device.

The first obtaining device obtains position information. The position information is information for locating the position of a local station (e.g., a radio base station that obtains the position information). One example of the position information is information included in GPS (global positioning system) radio waves transmitted from one or multiple GPSs. By obtaining the position information, the radio base station can locate its position (indicated by, for example, a latitude and longitude).

The second obtaining device obtains a matrix including multiple blocks. Each block represents an area (e.g., a geographical area) with which a uniquely identifiable cell identifier is associated. Thus, the matrix including the blocks represents a region (e.g., a major region) in which multiple areas (e.g., segmented areas) corresponding to the respective blocks are combined. The matrix has a size that covers at least a cell coverage of the local station (i.e., the radio base station that obtains the block matrix) and cell coverages in which use of the same cell identifiers as those of the local station is to be avoided (in other words, use of the same identifier is not permitted). The matrix may have, for example, a size that covers at least the cell coverage of the radio base station that obtains the matrix and the cell coverage of at least another radio base station that is adjacent to or near that radio base station.

The specifying device specifies cell identifiers associated with the blocks included in the cell coverage of the local station, on the basis of the position information and the matrix. For example, when the number of blocks included in the cell coverage of the local station located in the matrix on the basis of the position information is one, the specifying device specifies the cell identifier associated with the single block. Alternatively, for example, when the number of blocks included in the cell coverage of the local station located in the matrix on the basis of the position information is plural, the specifying device specifies the cell identifiers associated with the respective blocks. The cell identifier(s) specified by the specifying device is (are) used to identify, for example, the cell of the local station.

The above-described object may also be realized by a cell-identifier specifying method including a first obtaining process, a second obtaining process, and a specifying process. In the first obtaining process, an operation that may be substantially similar to the operation performed by the first obtaining device described above is performed. Specifically, in the first obtaining process, position information for locating the position of a local station is obtained. In the second obtaining process, an operation that may be substantially similar to the operation performed by the second obtaining device described above is performed. More specifically, in the second obtaining process, a matrix is obtained which includes multiple blocks representing areas with which different cell identifiers are associated and that covers the cell coverage of the local station and cell coverages in which use of the same cell identifiers as those of the local station is to be avoided. In the specifying process, an operation that may be substantially similar to the operation performed by the specifying device described above is performed. More specifically, in the specifying process, the cell identifiers associated with the blocks included in the cell coverage of the local station are specified on the base of the position information and the matrix.

According to the above-described radio base station and cell-identifier specifying method, the radio base station itself can automatically or autonomously specify cell identifiers to be used thereby, on the basis of the position information and the matrix. Thus, compared to a configuration in which the operator manually specifies cell identifiers to be used by the radio base station, it is possible to reduce costs (e.g., temporal cost, expense cost, and operational cost) for specifying (or assigning or setting) the cell identifiers.

In addition, the matrix used for specifying the cell identifiers covers the cell coverages in which use of the same cell identifiers as those of the local station is to be avoided. Thus, not only the cell coverage of the local station but also the cell coverages of other radio base stations in which use of the same cell identifiers as those of the local station is to be avoided are arranged in the matrix. Consequently, the cell identifiers specified based on the matrix differ from the cell identifiers used by another radio base station. Thus, it is possible to appropriately specify cell identifiers so that the cell identifiers of adjacent cells are different from each other, while reducing the costs for specifying the cell identifiers.

The cell-identifier specifying method described above may also provide the same advantage as the radio base station described above.

The present invention will be described below with reference to the accompanying drawings.

(1) First Embodiment

First, a description will be given of a radio communication system according to a first embodiment.

(1-1) Overall Configuration of Radio Communication System

An overall configuration of a radio communication system 1 according to a first embodiment will first be described with reference to FIG. 1. FIG. 1 is a block diagram illustrating one example of the overall configuration of the radio communication system 1 according to the first embodiment.

As illustrated in FIG. 1, the radio communication system 1 according to the first embodiment includes an eNB (evolution Node B) 100*a*, an eNB 100*b*, user equipment (UE) 300*a*, UE 300*b*, UE 300*c*, cells 150*a*, 150*b*, and a GPS satellite 500. The number of eNBs, UEs, cells, and GPS satellites illustrated in FIG. 1 are exemplary and the number of eNBs, UEs, cells, and GPS satellites are not limited to those illustrated in FIG. 1. Hereinafter, when a description is given without distinction between the eNB 100*a* and the eNB 100*b*, they may be referred to as "eNB 100" hereinafter for convenience of description. Similarly, when a description is given without distinction among the UE 300*a*, the UE 300*b*, and the UE 300*c*, they may be referred to as "UE 300" hereinafter. Also similarly, when a description is given without distinction between cell 150*a* and cell 150*b*, they may be referred to as "cell 150" hereinafter.

The eNB 100 may be a radio base station that covers a cell 150 having a cell radius of about a few kilometers to about a dozen of kilometers or to about several tens of kilometers. For example, in the example illustrated in FIG. 1, the eNB 100*a* is a radio base station that covers a cell 150*a* and the eNB 100*b* is a radio base station that covers a cell 150*b*. The eNB 100 performs radio communication with the UE 300 located in the cell 150 covered by the eNB 100. That is, the eNB 100 establishes a communication connection with the UE 300 located in the cell 150 covered by the eNB 100 and transmits/receives data to/from the UE 300. The cell 150 covered by each eNB 100 may be arranged so that part of the cell 150 overlaps part or the entirety of another cell 150 or so that any part of the cell 150 does not overlap another cell 150. In the example illustrated in FIG. 1, the cell 150*a* does not overlap the cell 150*b* adjacent to the cell 150*a*.

The UE 300 serves as a mobile terminal that establishes a connection with the eNB 100 for the cell 150 in which the UE 300 is located and that transmits/receives data. The UE 300 can utilize various services or applications (e.g., a mail service, a voice call service, a web viewing service, and a packet communication service) via the eNB 100 (and further a high-order station (not illustrated) connected above the eNB 100). Examples of such UE 300 include a mobile phone, a PDA (personal digital assistant), and various types of information equipment having a radio communication function. That is, the radio communication system 1 according to the first embodiment may be, for example, a mobile phone system or a mobile communication system.

The GPS satellite 500 transmits GPS data including orbit information thereof and time information based on a high-precision atomic clock. In the radio communication system 1 according to the first embodiment, the eNB 100 receives the GPS data. Thus, on the basis of the received GPS data, the eNB 100 can locate the position thereof. FIG. 1 illustrates only one GPS satellite 500, for simplicity of illustration. In practice, however, GPS data from at least three GPS satellites is typically received by using a positioning method (a method for locating the position of a local station). In practice, therefore, it is preferable that the radio communication system 1 has at least three GPS satellites 500.

Although the eNB 100 that covers the cell 150 (commonly referred to as a "macrocell") has a cell radius of about a few kilometers to about a dozen of kilometers or to about several tens of kilometers has been exemplified in the above description, a radio base station that covers a cell (commonly referred to as a "microcell") having a cell radius of about a few hundreds of meters to about one kilometer or a radio base station that covers a cell (commonly referred to as a "femtcell") having a cell radius of about a few meters to about a dozen of meters or to about several tens of meters may be provided instead of the above-described eNB 100. Another radio base station that covers a cell having a cell radius size other than the above-described cell radius size may also be provided.

(1-2) Block Diagram

Basic configurations of the eNB 100 and the UE 300 included in the radio communication system 1 according to the first embodiment will be described next with reference to FIGS. 2 and 3.

(1-2-1) Block Diagram of eNB

A basic configuration of the eNB 100 according to the first embodiment will first be described with reference to FIG. 2. FIG. 2 is a block diagram illustrating one example of the basic configuration of the eNB 100 according to the first embodiment.

Figure 2:
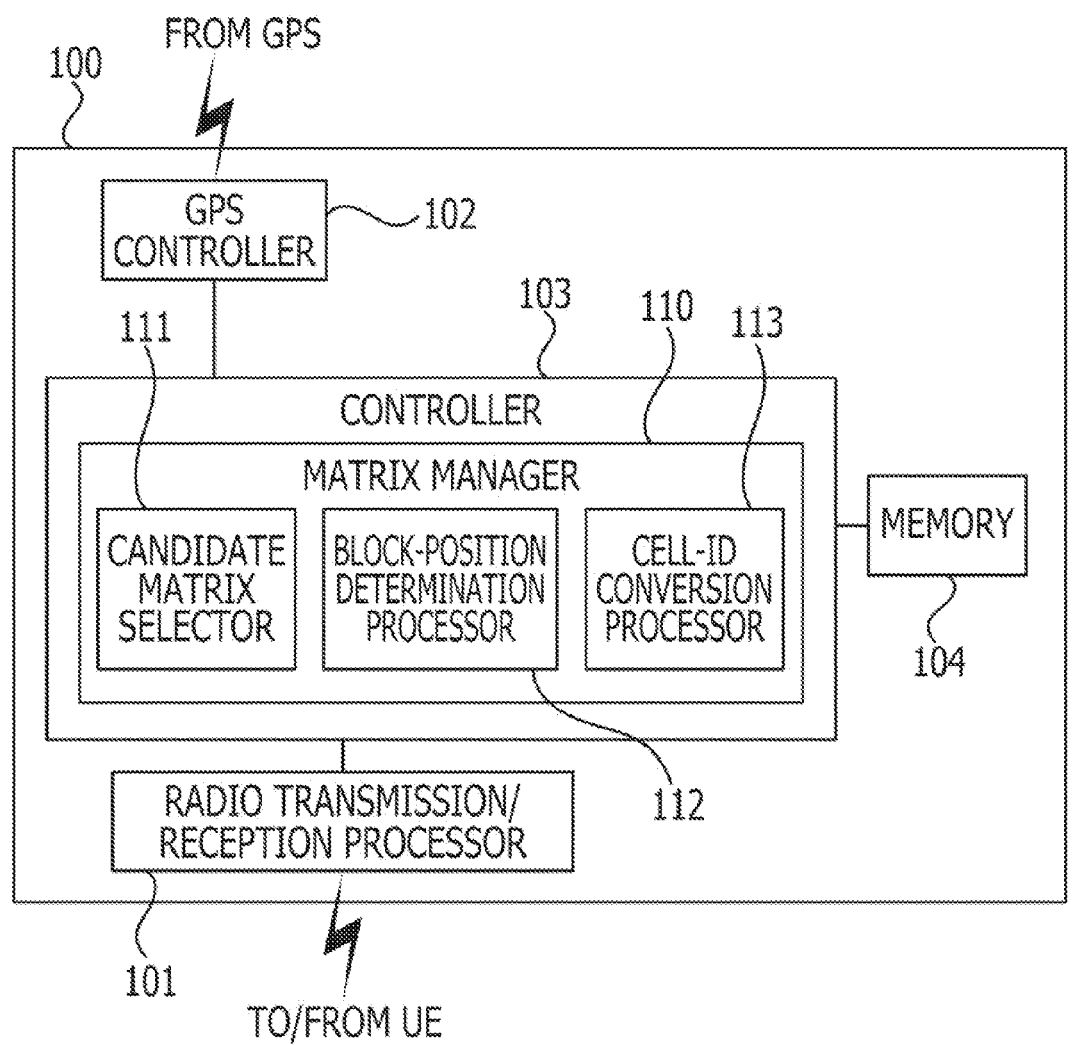
FIG. 2 is a block diagram illustrating a basic configuration of an eNB according to the first embodiment.

As illustrated in FIG. 2, the eNB 100 includes a radio transmission/reception processor 101, a GPS controller 102, a controller 103, and a memory 104.

The radio transmission/reception controller 101 transmits data, generated by the controller 103 or the like, to the UE 300. The radio transmission/reception processor 101 also receives data transmitted from the UE 300. Thus, the radio transmission/reception processor 101 includes, for example, a baseband processing circuit, a modulation circuit, a demodulation circuit, an RF (radio frequency) circuit, and an antenna. The baseband processing circuit performs baseband processing including data encoding processing (e.g., processing of error correction encoding, such as convolution coding or turbo coding), decoding processing, or the like. The modulation circuit performs modulation processing, such as QPSK (Quadrature Phase Shift Keying) modulation or 16-QAM (16 Quadrature Amplitude Modulation). The demodulation circuit performs demodulation processing. The RF circuit adjusts power to be transmitted or received. The antenna transmits and receives radio waves.

The GPS controller 102 is one embodiment of the first obtaining device described above and receives the GPS data transmitted from one or multiple GPS satellites 500 (more specifically, for example, three or four GPS satellites 500). The GPS data is one embodiment of the above-described position information. On the basis of the received GPS data, the GPS controller 102 locates the geographic position (e.g., a latitude and longitude) of the eNB 100. Position data indicating the located position of the eNB 100 is sent from the GPS controller 102 to the controller 103.

The controller 103 controls an overall operation of the eNB 100. One example of the controller 103 is a CPU (central processing unit) that operates according to, for example, specified firmware.

The controller 103 has a matrix manager 110 as a logical or functional processing block. On the basis of the position data obtained by the GPS controller 102, the matrix manager 110 specifies cell IDs (identifiers) to be used by the eNB 100. The matrix manager 110 has, as logical or functional blocks, a candidate matrix selector 111 according to one embodiment of the above-described second obtaining device, a block-position determination processor 112 according to one embodiment of the above-described specifying device, and a cell-ID conversion processor 113 according to one embodiment of the above-described specifying device. Those processing blocks may be realized, for example, as operations of one or some programs of firmware that defines the operation of the controller 103 or as operations of a program that is independent from the firmware. Alternatively, the candidate matrix selector 111, the block-position determination processor 112, and the cell-ID conversion processor 113 may be realized as a single circuit that is independent from the controller 103.

The candidate matrix selector 111 specifies a matrix 160 (described below) used for uniquely specifying cell IDs. The specified matrix 160 is reported from the candidate matrix selector 111 to the block-position determination processor 112. The matrix 160 includes multiple blocks 170, as described below. Thus, in the following description, the matrix 160 will be referred to as "block matrix 160".

The block-position determination processor 112 converts the position data, obtained by the GPS controller 102, into a position in the block matrix 160 specified by the candidate matrix selector 111. More specifically, the block-position determination processor 112 specifies one of the blocks 170 which corresponds to the position data obtained by the GPS controller 102, the blocks 170 being included in the block matrix 160 specified by the candidate matrix selector 111. The specified block 170 is reported from the block-position determination processor 112 to the cell-ID conversion processor 113.

On the basis of the matrix 160 specified by the candidate matrix selector 111 and the block 170 specified by the block-position determination processor 112, the cell-ID conversion processor 113 specifies cell IDs to be used by the eNB 100.

Detailed operations of the candidate matrix selector 111, the block-position determination processor 112, and the cell-ID conversion processor 113 are described in conjunction with an operation example below.

The memory 104 includes a storage area for temporarily storing data to be used internally by the eNB 100. The memory 104 may also include a storage area or the like that stores a program (or firmware) for performing an operation as the eNB 100. Examples of the memory 104 include a semiconductor memory, such as a RAM (random access memory), and various other types of recording media.

(1-2-2) Block Diagram of UE

A basic configuration of the UE 300 according to the first embodiment will be described next with reference to FIG. 3. FIG. 3 is a block diagram illustrating one example of the basic configuration of the UE 300 according to the first embodiment.

Figure 3:
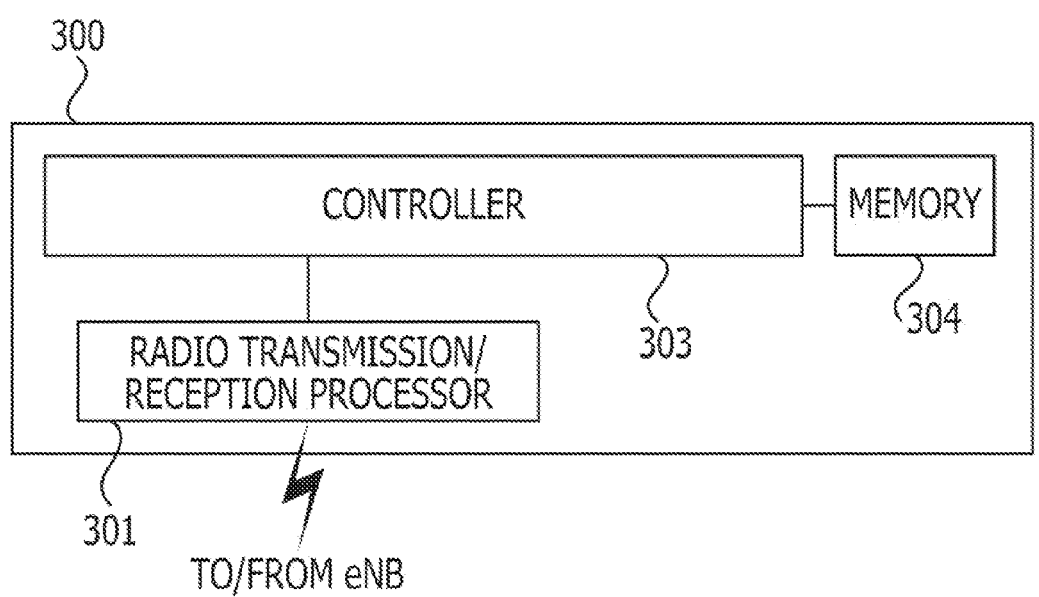
FIG. 3 is a block diagram illustrating a basic configuration of UE according to the first embodiment.

As illustrated in FIG. 3, the UE 300 includes a radio transmission/reception processor 301, a controller 303, and a memory 304.

The radio transmission/reception processor 301 has a configuration that may be substantially similar to that of the above-described radio transmission/reception processor 101. The radio transmission/reception processor 301 transmits data, generated by the controller 303 or the like, to the eNB 100 and also receives data transmitted from the eNB 100.

Thus, the radio transmission/reception processor 301 includes, for example, a baseband processing circuit, a modulation circuit, a demodulation circuit, an RF circuit, and an antenna, as in the above-described radio transmission/reception processor 101.

The controller 303 controls an overall operation of the UE 300. One example of the controller 303 is a CPU (central processing unit) that operates according to, for example, specified firmware.

The memory 304 includes a storage area for temporarily storing data to be used internally by the UE 300. The memory 304 may also include a storage area or the like that stores a program (or firmware) for performing an operation as the UE 300. Examples of the memory 304 include a semiconductor memory, such as a RAM (random access memory), and various other types of recording media.

(1-3) Operation

Figure 4:
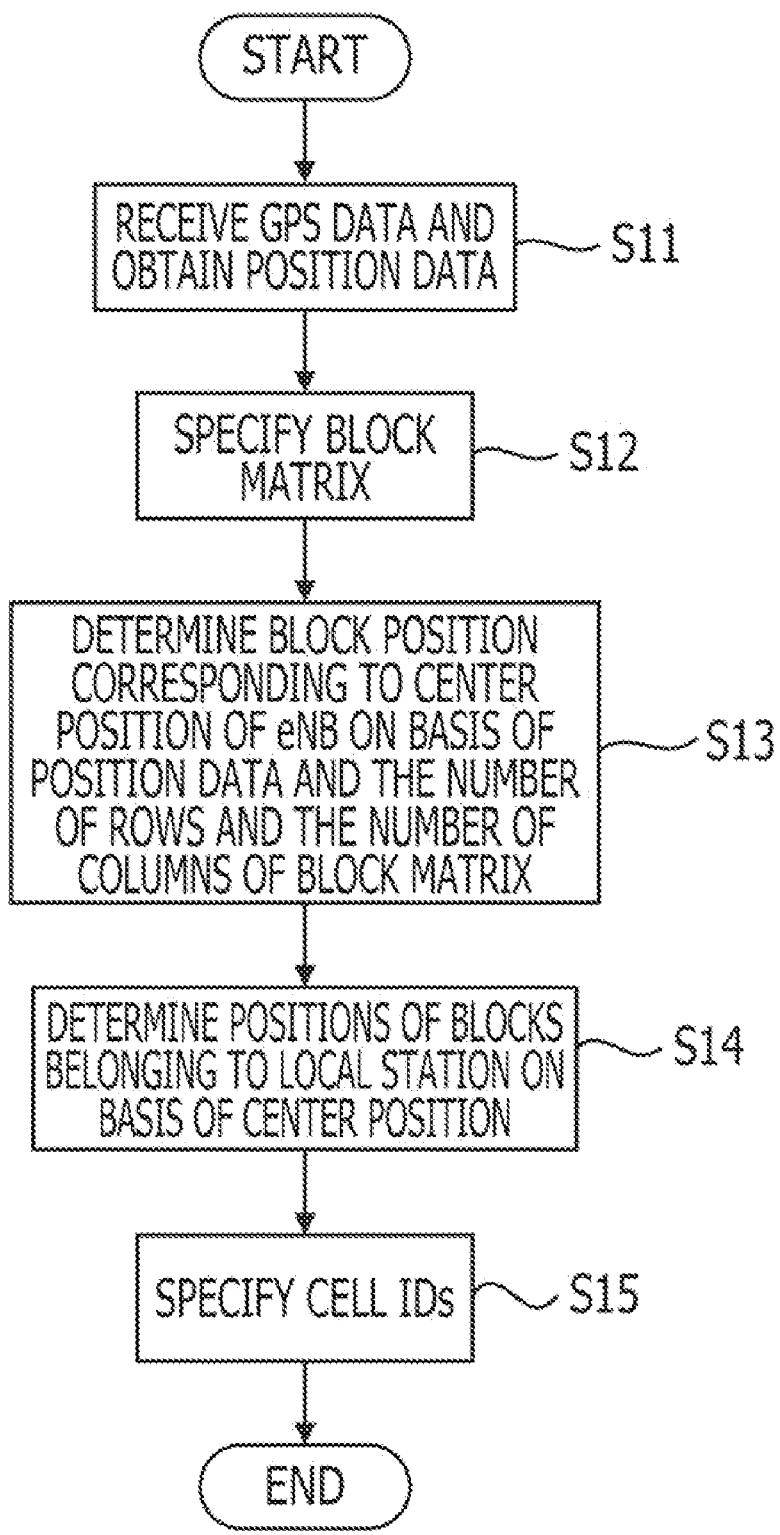
FIG. 4 is a flowchart illustrating a flow of an operation of the eNB included in the radio communication system according to the first embodiment.

An operation (e.g., cell-ID specifying operation) of the eNB 100 included in the radio communication system 1 according to the first embodiment will be described next with reference to FIG. 4. FIG. 4 is a flowchart illustrating one example of a flow of the operation of the eNB 100 included in the radio communication device 1 according to the first embodiment.

As illustrated in FIG. 4, in operation S11, the GPS controller 102 included in the eNB 100 receives GPS data (e.g., orbit information of the GPS satellites 500 and time information based on a high-precision atomic clock) transmitted from the GPS satellites 500. As a result, the GPS controller 102 obtains the position data of the eNB 100 on the basis of the received GPS data. A description below is given of an example in which the obtained position data includes the latitude (degree/minute/second) and the longitude (degree/minute/second) of the eNB 100. The position data, however, is not limited to this example and may be any data that allows the geographical position of the eNB 100 to be located. The obtained position data is sent from the GPS controller 102 to the controller 103.

In operation S12, the candidate matrix selector 111 included in the eNB 100 specifies a block matrix 160 to be used in subsequent processing. The specified block matrix 160 is reported from the candidate matrix selector 111 to the block-position determination processor 112.

Figure 5:
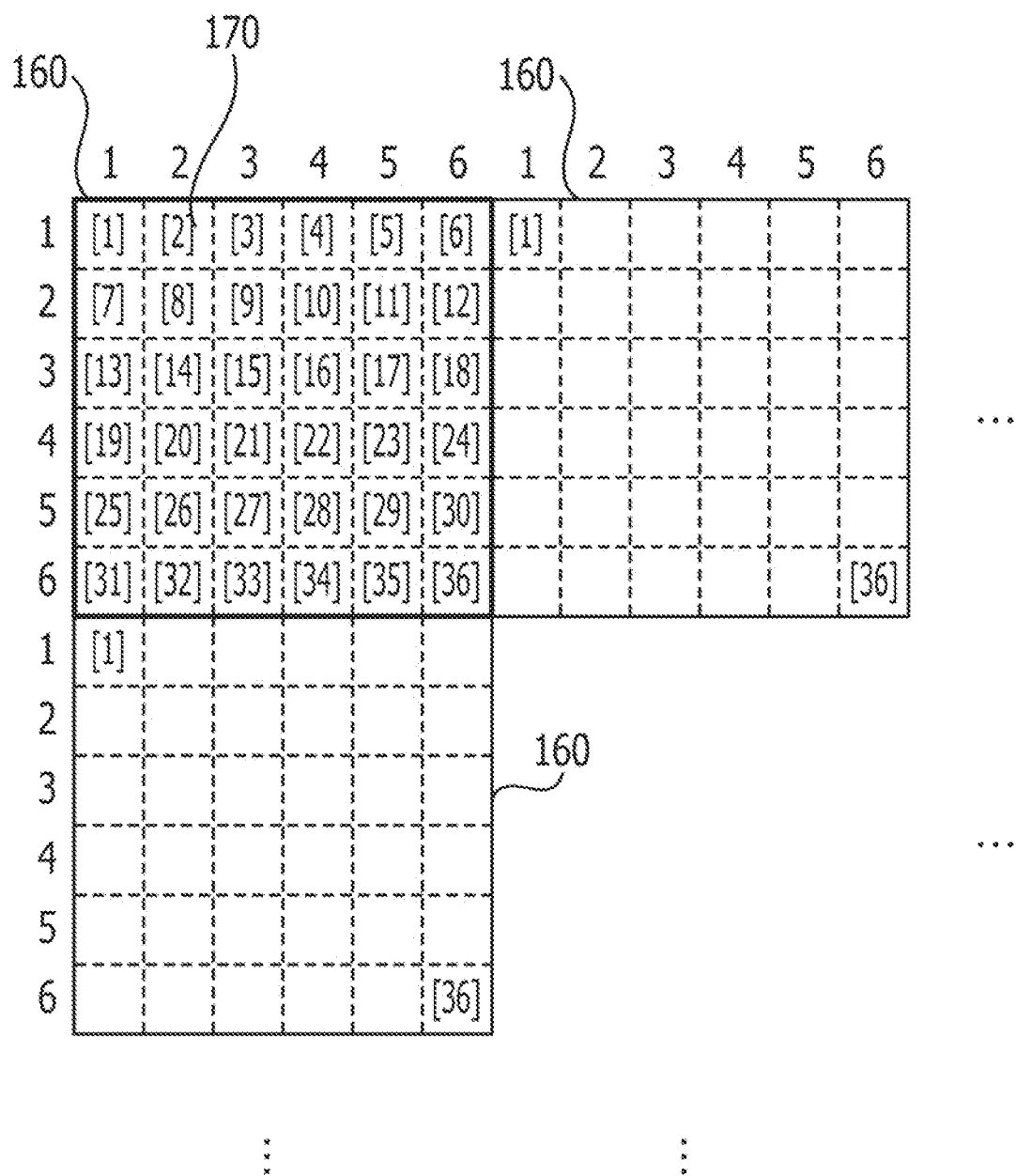
FIG. 5 is a plan view illustrating one example of block matrices.

The block matrices 160 will now be described in more detail with reference to FIG. 5. FIG. 5 is a plan view illustrating one example of the block matrices 160.

As illustrated in FIG. 5, each block matrix 160 has N×M blocks 170 arranged in a matrix having N rows×M columns (where N and M are integers of 1 or more). Each block matrix 160 illustrated in the example of FIG. 5 has 36 blocks 170 arranged in a matrix having 6 rows×6 columns, although any number of rows and columns may be used.

Each block 170 represents a specified area (in other words, a specified geographical area). Thus, the size (e.g., the vertical and horizontal dimensions in FIG. 5) of each block 170 is associated with a specified geographical distance. For example, when a situation in which the position data of the eNB 100 includes the latitude and longitude and one second corresponds to about 30.9 m is considered, the vertical and horizontal dimensions of one block may be associated with a distance of 30.9 m (or k times 30.9 m (where k is an integer of 2 or more)). With this arrangement, the eNBs 100 located at different latitudes and longitudes can be appropriately associated with the corresponding blocks 170, with the eNBs 100 being distinguished from each other. Needless to say, however, the size of each block 170 may be associated with another distance.

A unique cell ID is associated with each block 170. Specifically, in the example illustrated in FIG. 5, cell IDs which have an initial value of 1 are associated with the blocks 170 sequentially from the block 170 at the upper left end (which is the start position in the block matrix 160) to the block 170 at the lower right end (which is the end position in the block matrix 160), while the cell ID is incremented by 1. More specifically, in the example illustrated in FIG. 5, a cell ID that is expressed by 6×(X−1)+Y is associated with the block 170 in an Xth row and a Yth column (where X is an integer that satisfies 1≦X≦6 and Y is an integer that satisfies 1≦Y≦6). Regardless of the number of blocks 170, a unique cell ID is assigned to each block 170 in substantially the same manner as the example illustrated in FIG. 5.

For the cell-ID specifying operation, substantially the same block matrices 160 are arranged in a two-dimensional plane as illustrated in FIG. 5. That is, the same block matrices 160 are used so that they are arranged in a two-dimensionally extending plane, considering the situation in which the multiple eNBs 100 are provided in a geographically extending plane. With this arrangement, no matter what size or shape the plane in which the eNBs 100 are provided has, the block matrices 160 (or the blocks 170 included in each block matrix 160) and the multiple eNBs 100 can be appropriately associated with each other.

In order to specify such a block matrix 160, at least the number (i.e., N) of rows and the number (i.e., M) of columns of the blocks 170 in the block matrix 160, the size of each block 170, and the initial value (a start number) of the cell IDs are specified. Thus, in the first embodiment, it is preferable that the number of rows and the number of columns of the blocks 170 included in the block matrix 160 be pre-specified by, for example, an operator. It is also preferable that the size of each block 170 be pre-specified by, for example, the operator. In addition, it is preferable that the initial value (the start number) of the cell IDs be pre-specified by, for example, the operator. It is preferable that those numeric values preferably pre-specified be stored in the memory 104 or the like as parameters for operation of the eNB 100. For example, in the case of the block matrix 160 illustrated in FIG. 5, it is preferable that "6" indicating the number of blocks 170 included in the block matrix 160, "6"indicating the number of columns included in the block matrix 160, "30.9 m"indicating the size of each block 170, and "1" indicating the initial value (the start number) of the cell IDs be stored in the memory 104 or the like as parameters for operation. Accordingly, it is preferable that the candidate matrix selector 111 specify the block matrix 160 by obtaining the parameters.

In addition, it is preferable that those parameters be appropriately set so as to reduce or prevent adjacent or nearby eNBs 100 from redundantly using the same cell ID. For example, it is preferable that those parameters be set so that the cell 150a of one eNB 100a and the cell(s) 150b of one or multiple eNB(s) 100b adjacent to or near the eNB 100a be covered by one block matrix 160.

The arrangement may also be such that the block matrix 160 itself is directly obtained, instead of specifying the block matrix 160 through obtaining the parameters used to specify the block matrix 160. In such a case, although the amount of use of the memory 104 increases since the block matrix 160 itself is stored in the memory 104, there is no need to specify the detailed configuration of the block matrix 160. Thus, it is possible to reduce the processing load of the controller 103.

Referring back to FIG. 4, in operation S13, the block-position determination processor 112 included in the eNB 100 determines, in the block matrix 160, the block 170 corresponding to the position (center position) of the eNB 100 located by the latitude and longitude included in the position data. Information indicating the determined block 170 corresponding to the position of the eNB 100 is reported from the block-position determination processor 112 to the cell-ID conversion processor 113.

In the first embodiment, it is preferable that the row number of a specific block 170 that is included in the block matrix 160 and that corresponds to the position of the eNB 100 be determined from the remainder obtained by dividing the latitude included in the position data indicating the position of the eNB 100 by the number of rows of the blocks 170 included in the block matrix 160. More specifically, the block-position determination processor 112 sets associations of the remainder and the number of rows of the blocks 170. Alternatively, for example, the associations of the remainder and the number of rows of the blocks 170 may be pre-set by the operator or the like and the set associations of the remainder and the number of rows of the blocks 170 may be pre-stored in the memory 104 or the like. For example, in the case of the example illustrated in FIG. 5, it is assumed that setting has been performed so that row number "1" corresponds to a case in which the remainder is "0", row number "2" corresponds to a case in which the remainder is "1", row number "3"corresponds to a case in which the remainder is "2", row number "4"corresponds to a case in which the remainder is "3", row number "5"corresponds to a case in which the remainder is "4", and row number "6"corresponds to a case in which the remainder is "5". It is now assumed the remainder obtained by dividing the latitude (more specifically, a parameter uniquely derived from the latitude) included in the position data indicating the position of the eNB 100 by the number "6" of rows of the blocks 170 included in the block matrix 160 is 4. In this case, the row number of the block 170 that is included in the block matrix 160 and that corresponds to the position of the eNB 100 is determined to be "4".

Similarly, in the first embodiment, it is preferable that the column number of the block 170 that is included in the block matrix 160 and that corresponds to the position of the eNB 100 be determined from the remainder obtained by dividing the longitude included in the position data indicating the position of the eNB 100 by the number of columns of the blocks 170 included in the block matrix 160. That is, in the case of the longitude, it is also preferable that the column number of the block 170 that is included in the block matrix 160 and that corresponds to the position of the eNB 100 be determined in substantially the same manner as in the case of the latitude.

In operation S14, the cell-ID conversion processor 113 included in the eNB 100 determines the blocks 170 included in the range of the cell 150 of the eNB 100. More specifically, first, the cell-ID conversion processor 113 obtains the radius of the cell 150 of the eNB 100, the cell radius being stored in the memory 104 or the like as an operation parameter of the eNB 100. Thereafter, the cell-ID conversion processor 113 specifies, in the block matrix 160, a cell that has substantially the same radius as the obtained cell radius and that has at its center the specific block 170 corresponding to the eNB 100 position determined in operation S13. Thus, the cell-ID conversion processor 113 can specify a cell 150 in the block matrix 160. Thereafter, the cell-ID conversion processor 113 can determine the blocks 170 included in the range of the cell 150 specified in the block matrix 160. In the first embodiment, it is preferable that the block 170 that is entirely included in the range of the cell 150 specified in the block matrix 160 be determined as the block 170 included in the range of the cell 150 of the eNB 100. In other words, in the first embodiment, it is preferable that the block 170 that is partially included in the range of the cell 150 specified in the block matrix 160 not be determined as the block 170 included in the range of the cell 150 of the eNB 100.

In operation S15, the cell-ID conversion processor 113 in the eNB 100 specifies, as cell IDs to be used by the eNB 100, the cell IDs being associated with the blocks 170 included in the range of the cell 150 and determined in operation S14. Subsequently, the cell IDs specified in operation S15 are used to perform radio communication with the UE 300.

It is preferable that at least one block 170 be included in the range of the cell 150 of the eNB 100, considering that the cell ID(s) associated with the block(s) 170 included in the range of the cell 150 is (are) specified as cell ID(s) to be used by the eNB 100. It is, therefore, preferable that the parameters (e.g., the number of rows and the number of columns of the blocks 170 included in the block matrix 160, the size of each block 170, and the initial value of the cell IDs) for specifying the block matrix 160 be pre-specified so as to realize a state in which at least one block 170 is included in the range of the cell 150 of the eNB 100.

Figure 6:
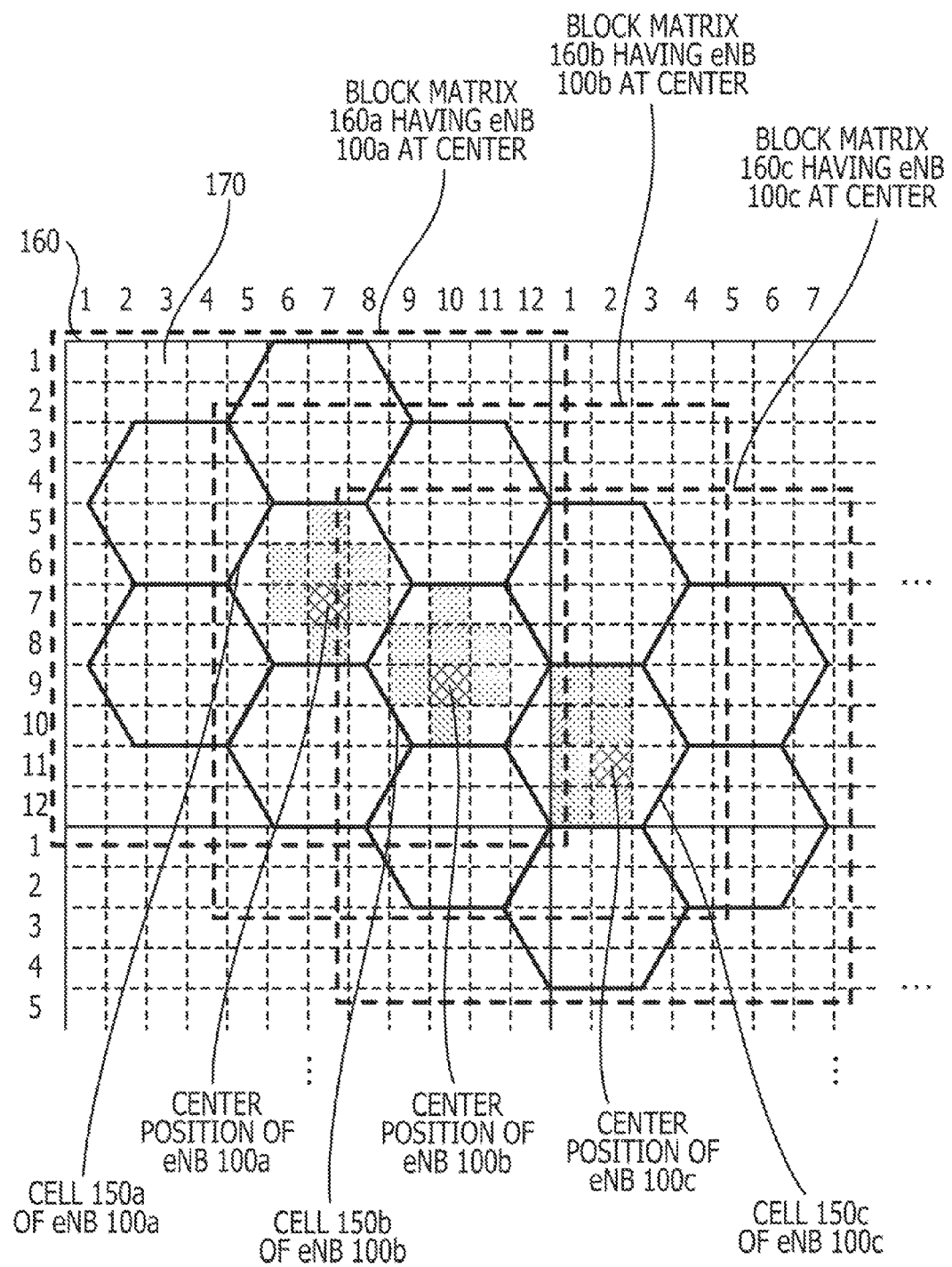
FIG. 6 is a plan view illustrating, in block matrices, a specific cell-ID specifying operation.

The cell-ID specifying operation described above will be described in more detail with reference to an embodiment illustrated in FIG. 6. FIG. 6 is a plan view illustrating, in block matrices 160, the specific cell-ID specifying operation.

A description will be given of an example in which the cell-ID specifying operation is performed using block matrices 160 each having 12 rows and 12 columns, as illustrated in FIG. 6. The initial value of the cell IDs is assumed to be 1. Thus, a cell ID that is expressed by 12×(X−1)+Y is associated with the block 170 in an Xth row and a Yth column (where X is an integer that satisfies $1 \leq X \leq 12$ and Y is an integer that satisfies $1 \leq Y \leq 12$). In the example of FIG. 6, multiple eNBs 100 that cover corresponding cells 150, each being approximated to have a hexagonal shape and being indicated by a thick solid line, are arranged to have a honeycomb structure.

In this case, the cell IDs used by one eNB 100 located at the center should not conflict with the cell IDs used by six eNBs 100 adjacent to that eNB 100. Thus, the number of rows and the number of columns of the blocks 170 included in the block matrix 160, the size of each block 170, and the initial value of the cell IDs are pre-set so that the cell 150 of one eNB 100 located at a center and six cells 150 of six eNBs 100 adjacent to the center eNB 100 are covered by one block matrix 160.

First, a description will be given of a cell-ID specifying operation performed by an eNB 100a. In this case, the eNB 100a determines the block 170 corresponding to the position thereof. It is assumed that, as a result of the determination, it is determined that the block 170 corresponding to the position of the eNB 100a is the block 170 in the seventh row and the seventh column, the block 170 being indicated by dark hatching in FIG. 6. The eNB 100a then determines blocks 170 included in the range of the cell 150a of the eNB 100a. For example, it is assumed that the cell 150a of the eNB 100a extends in the range of the block matrix 160, as illustrated in FIG. 6. In this case, the fifth-row and seventh-column block 170, the sixth-row and sixth-column block 170, the sixth-row and seventh-column block 170, the sixth-row and eighth-column block 170, the seventh-row and sixth-column block 170, the seventh-row and seventh-column block 170, the seventh-row and eighth-column block 170, and the eighth-row and seventh-column block 170 (which are indicated by light hatching in FIG. 6) are determined as the blocks 170 included in the range of the cell 150a of the eNB 100a. As a result, the eNB 100a specifies 55, 66, 67, 68, 78, 79, 80, and 91 as cell IDs to be used thereby.

Next, a description will be given of a cell-ID specifying operation performed by an eNB 100b adjacent to the eNB 100a. In this case, the eNB 100b determines the block 170 corresponding to the position thereof. It is assumed that, as a result of the determination, it is determined that the block 170 corresponding to the position of the eNB 100b is the block 170 in the ninth row and the tenth column, the block 170 being indicated by dark hatching in FIG. 6. The eNB 100b then determines blocks 170 included in the range of the cell 150b of the eNB 100b. For example, when the cell 150b of the eNB 100b is assumed to extend in a range in the block 160 as illustrated in FIG. 6, the seventh-row and tenth-column block 170, the eighth-row and ninth-column block 170, the eighth-row and tenth-column block 170, the eighth-row and eleventh-column block 170, the ninth-row and ninth-column block 170, the ninth-row and tenth-column block 170, the ninth-row and eleventh-column block 170, and the tenth-row and tenth-column block 170 (which are indicated by light hatching in FIG. 6) are determined as the blocks 170 included in the range of the cell 150b of the eNB 100b. As a result, the eNB 100b specifies 82, 93, 94, 95, 105, 106, 107, and 118 as cell IDs to be used thereby. The cell IDs are different from the cell IDs to be used by the eNB 100a adjacent to the eNB 100b.

Next, a description will be given of a cell-ID specifying operation performed by an eNB 100c that is adjacent to the eNB 100b and that is not adjacent to the eNB 100a. In this case, the eNB 100c determines the block 170 corresponding to the position thereof. It is assumed that, as a result of the determination, it is determined that the block 170 corresponding to the position of the eNB 100c is the block 170 in the eleventh row and the second column, the block 170 being indicated by dark hatching in FIG. 6. The eNB 100c then determines blocks 170 included in the range of the cell 150c of the eNB 100c. For example, when the cell 150c of the eNB 100c is assumed to extend in a range in the block 160 as illustrated in FIG. 6, the ninth-row and first-column block 170, the ninth-row and second-column block 170, the tenth-row and first-column block 170, the tenth-row and second-column block 170, the eleventh-row and first-column block 170, the eleventh-row and second-column block 170, the twelfth-row and first-column block 170, and the twelfth-row and second-column block 170 (which are indicated by light hatching in FIG. 6) are determined as the blocks 170 included in the range of the cell 150c of the eNB 100c. As a result, the eNB 100c specifies 97, 98, 109, 110, 121, 122, 133, and 134 as cell IDs to be used thereby. The cell IDs are different from the cell IDs to be used by the eNB 100b adjacent to the eNB 100c.

Although a detailed description is not given for simplicity of description, cell IDs for eNBs 100 other than the eNBs 100a to 100c are specified as the cell IDs used by the corresponding eNBs 100 so that they are different from the cell IDs used by the adjacent eNBs 100.

As described above, according to the eNB 100 included in the radio communication system 1 of the first embodiment, cell IDs to be used by the eNB 100 can be automatically or autonomously specified based on the position data determined based on the GPS data and the preset block matrix 160. Accordingly, compared to a configuration in which the operator manually sets cell IDs to be used by the eNB 100, it is possible to reduce costs (e.g., temporal cost, expense cost, and operational cost) for specifying the cell IDs.

In addition, the block matrix 160 including N-row×M-column blocks 170 used for specifying cell IDs covers cell coverages in which use of the same cell IDs is to be avoided. Thus, the cell coverage of the eNB 100 located at the center and the cell coverages of other eNBs in which use of the same cell IDs as those of the center eNB 100 is to be avoided are arranged in the block matrix 160. Consequently, the cell IDs specified based on such a block matrix 160 differ from the cell IDs used by another eNB 100. Thus, it is possible to appropriately specify cell IDs so that the cell IDs of adjacent cells 150 are different from each other, while reducing the costs for specifying the cell IDs.

In the first embodiment, the block matrix 160 may be set so that it includes the cell 150 of one eNB 100 for which cell IDs are to be specified and the cell(s) 150 of one or multiple eNB(s) 100 adjacent to that eNB 100. Thus, when attention is given to one eNB 100 of interest, the blocks 170 included in the range of the cell 150 of the eNB 100 of interest are not redundantly included in the range(s) of the cell(s) 150 of the adjacent eNB(s) 100 in the virtual block matrix 160 including the eNB 100 of interest at the center and the cell(s) 150 of the adjacent eNB(s) 100. More specifically, as illustrated in FIG. 6, when attention is given to the eNB 100a, the virtual block matrix 160a having the eNB 100a at the center includes the first-row and first-column block 170 to the twelfth-row and twelfth-column block 170. As can be seen from the block matrix 160a, the blocks 170 included in the range of the cell 150 of the eNB 100a (e.g., the fifth-row and seventh-column block 170, the sixth-row and sixth-column block 170, the sixth-row and seventh-column block 170, the sixth-row and eighth-column block 170, the seventh-row and sixth-column block 170, the seventh-row and seventh-column block 170, the seventh-row and eighth-column block 170, and the eighth-row and seventh-column block 170) are not redundantly included in the ranges of the cells 150 of the six eNBs 100 adjacent to the eNB 100a. Similarly, as illustrated in FIG. 6, when attention is given to the eNB 100b, the virtual block matrix 160b having the eNB 100b at its center includes the third-row and fifth-column block 170 to the second-row and fourth-column block 170. As can be understood from the block matrix 160b, the blocks 170 included in the range of the cell 150 of the eNB 100b (e.g., the seventh-row and tenth-column block 170, the eighth-row and ninth-column block 170, the eighth-row and tenth-column block 170, the eighth-row and eleventh-column block 170, the ninth-row and ninth-column block 170, the ninth-row and tenth-column block 170, the ninth-row and eleventh-column block 170, and the tenth-row and tenth-column block 170) are not redundantly included in the range of the cells 150 of the six eNBs 100 adjacent to the eNB 100b. Similarly, as illustrated in FIG. 6, when attention is given to the eNB 100c, the virtual block matrix 160c having the eNB 100c at its center includes the fifth-row and eighth-column block 170 to the fourth-row and seventh-column block 170. As can be understood from the block matrix 160c, the blocks 170 included in the range of the cell 150 of the eNB 100c (e.g., the ninth-row and first-column block 170, the ninth-row and second-column block 170, the tenth-row and first-column block 170, the tenth-row and second-column block 170, the eleventh-row and first-column block 170, the eleventh-row and second-column block 170, the twelfth-row and first-column block 170, and the twelfth-row and second-column block 170) are not redundantly included in the range of the cells 150 of the six eNBs 100 adjacent to the eNB 100c. As in the manner described above, the cell IDs specified based on the block matrix 160 described above are different from the cell IDs used by the adjacent eNBs 100. Thus, it is possible to specify cell IDs so that the cell IDs of the adjacent cells are different from each other, while reducing the costs for specifying the cell IDs.

By referring to the preset cell radius and the eNB 100 position located by the position data, the eNB 100 can specify, in the block matrix 160, the cell 150 of the eNB 100. In other words, the eNB 100 can specify, in the block matrix 160, the cell 150 of the eNB 100, without determining the size and the shape of the actual cell 150 and so on by using complicated and advanced arithmetic operations. Thus, the eNB 100 can relatively easily specify the blocks 170 included in the cell 150 of the eNB 100.

The eNB 100 also determines, in the block matrix 160, one of the blocks 170 which corresponds to the position of the eNB 100 by using the remainders obtained by dividing the latitude and longitude included in the position data. Thus, one block 170 corresponding to the position of the eNB 100 can be determined in the block matrix 160.

In addition, since the block 170 corresponding to the position of the eNB 100 is determined using the remainders, as described above, one block 170 corresponding to the position of the eNB 100 can be determined even when block matrices 160 each covering a relatively small range are used and arranged in a matrix. If latitudes and longitudes are to be directly associated with the blocks 170, an enormous or huge block matrix 160 associated with all areas is typically prepared to which the radio communication system 1 is applied. Accordingly, according to the first embodiment, since the remainders are used as described above to determine the block 170 corresponding to the position of the eNB 100, the entire region to which the radio communication system 1 is applied can be covered by a relatively small block matrix 160.

(2) Second Embodiment

Next, a description will be given of a radio communication system 2 according to a second embodiment. The configurations and operations that are substantially the same as those of the radio communication device 1 according to the first embodiment are denoted by the same reference numerals and detailed descriptions thereof are not given hereinafter.

(2-1) Overall Configuration of Radio Communication System

Figure 7:
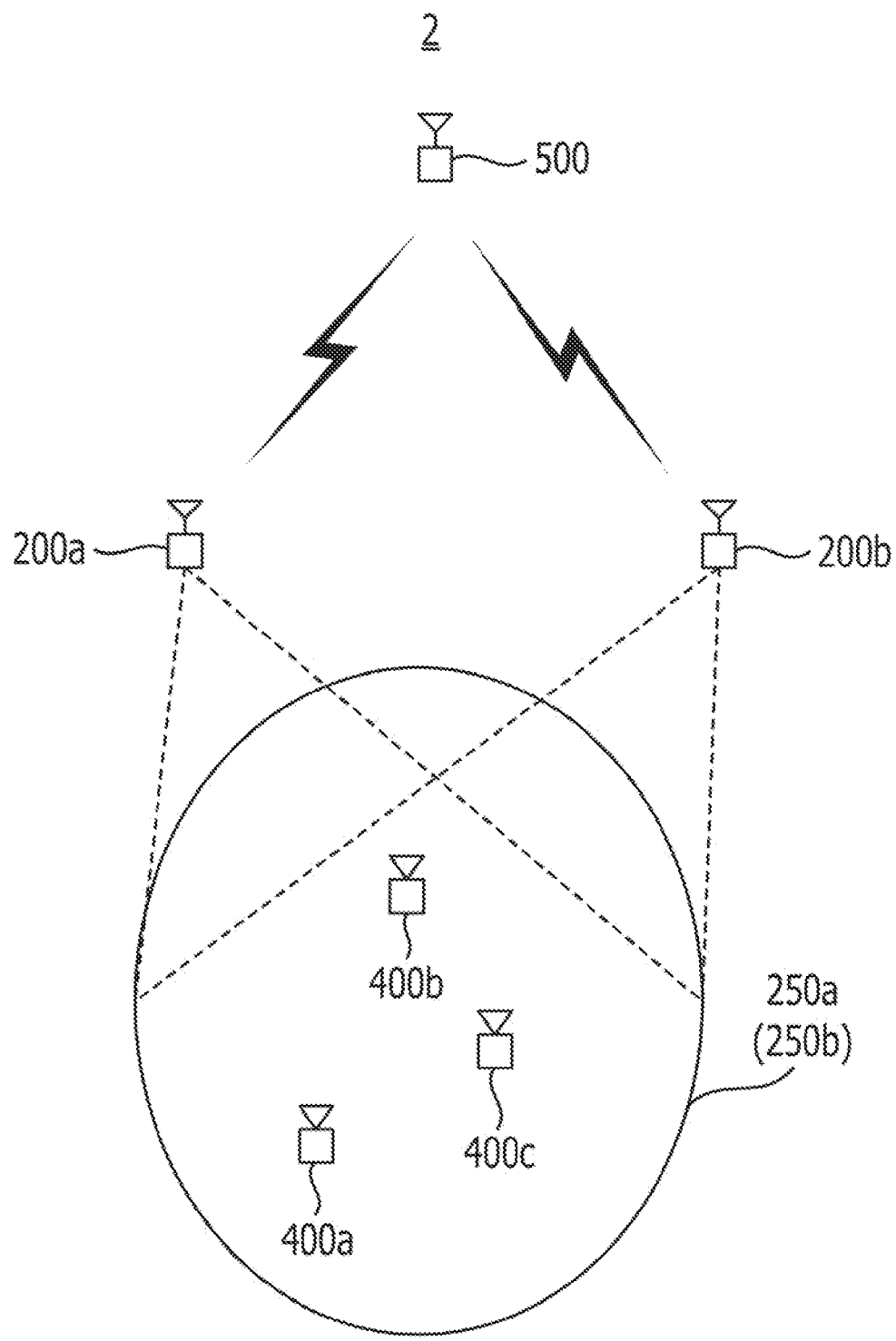
FIG. 7 is a block diagram illustrating a basic configuration of a radio communication system according to a second embodiment.

An overall configuration of the radio communication system 2 according to the second embodiment will first be described with reference to FIG. 7. FIG. 7 is a block diagram illustrating one example of the overall configuration of the radio communication system 2 according to the second embodiment.

As illustrated in FIG. 7, the radio communication system 2 according to the second embodiment includes an eNB (e-Node B) 200a, an eNB 200b, UE (user equipment) 400a, UE 400b, UE 400c, and a GPS satellite 500. That is, the overall configuration of the radio communication system 2 according to the second embodiment may be substantially the same as the overall configuration of the radio communication system 1 according to the first embodiment illustrated in FIG. 1.

As illustrated in FIG. 7, however, the radio communication system 2 according to the second embodiment has a configuration in which a cell 250a of the eNB 200a overlaps a cell 250b of the eNB 200b (e.g., in which the eNB 200a and the eNB 200b are arranged at substantially the same position). In the radio communication system 2 according to the second embodiment, even when the cell 250a of one eNB 200a overlaps the cell 250b of another eNB 200b, the cell-ID specifying operation can be appropriately performed. Thus, the internal configurations and the operations of the eNB 200 and the UE 400 are different from those in the radio communication system 1 according to the first embodiment described above. The different points will be mainly described below in conjunction with the second embodiment.

(2-2) Block Diagram

Basic configurations of the eNB 200 and the UE 400 included in the radio communication system 2 according to the second embodiment will be described next with reference to FIGS. 8 and 9.

(2-2-1) Block Diagram of eNB

A basic configuration of the eNB 200 according to the second embodiment will first be described with reference to FIG. 8. FIG. 8 is a block diagram illustrating one example of the basic configuration of the eNB 200 according to the second embodiment.

Figure 8:
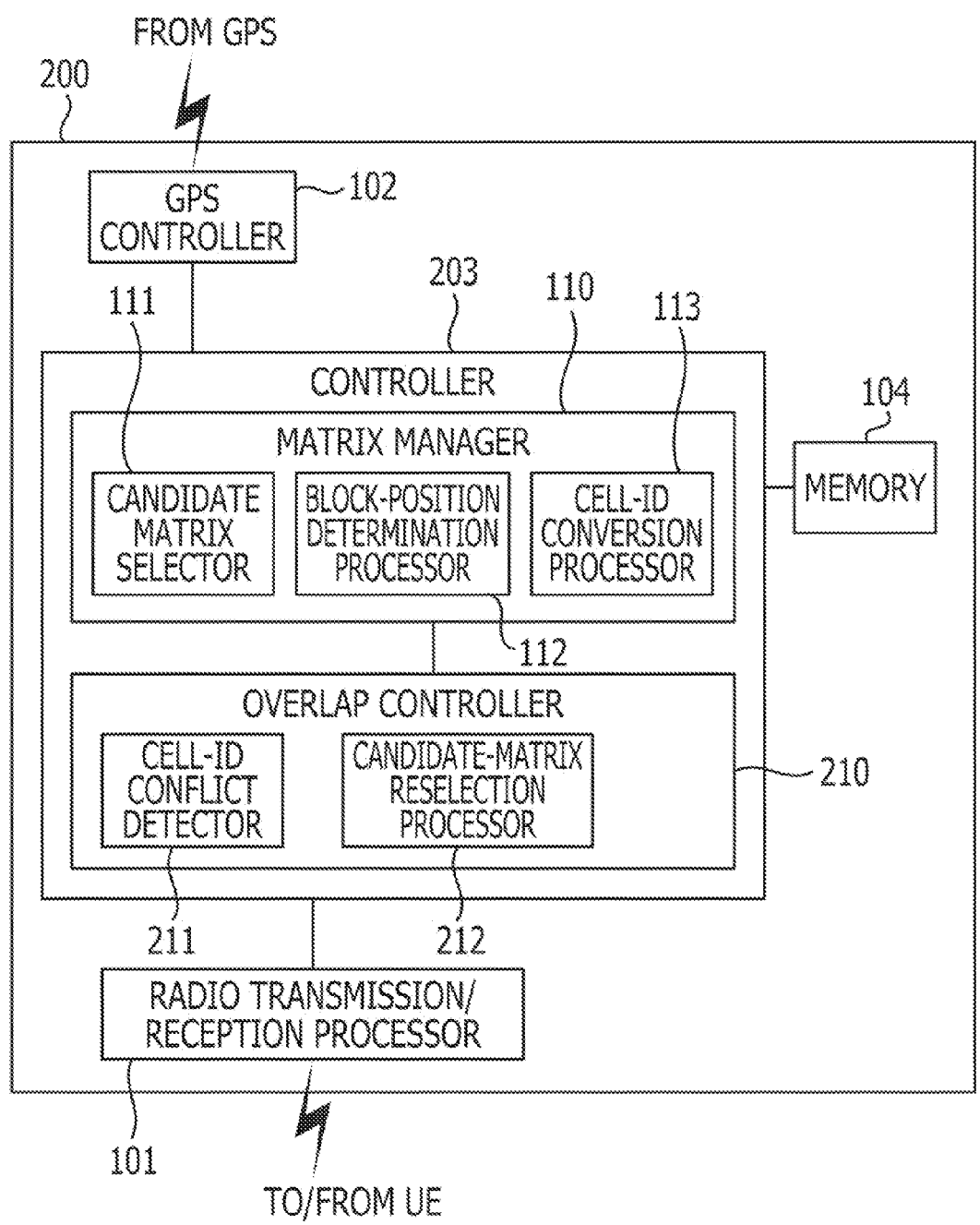
FIG. 8 is a block diagram illustrating a basic configuration of an eNB according to the second embodiment.

As illustrated in FIG. 8, the eNB 200 includes a radio transmission/reception processor 101, a GPS controller 102, a controller 203, and a memory 104, as in the eNB 100 according to the first embodiment. The controller 203 has, as a logical or functional processing block, a matrix manager 110, as in the eNB 100 according to the first embodiment. The matrix manager 110 has, as logical or functional processing blocks, a candidate matrix selector 111, a block-position determination processor 112, and a cell-ID conversion processor 113, as in the eNB 100 according to the first embodiment.

In the eNB 200 according to the second embodiment, the controller 203 has, as a logical or functional processing block, an overlap controller 210. The overlap controller 210 has, as logical or functional processing blocks, a cell-ID conflict detector 211 and a candidate-matrix reselection processor 212. Those processing blocks may be realized, for example, as operations of one or some programs of firmware that defines the operation of the controller 203 or as operations of a program that is independent from the firmware. Alternatively, the cell-ID conflict detector 211 and the candidate-matrix reselection processor 212 may be realized as a single circuit that is independent from the controller 203.

The cell-ID conflict detector 211 is one embodiment of the above-described determining device, and determines whether or not the cell ID is conflicting with the cell ID of another eNB 200 (in other words, whether or not the same cell IDs are redundantly used), on the basis of a message that is reported from the UE 400 and that indicates a radio-quality measurement result.

When the cell-ID conflict detector 211 determines that the cell IDs are conflicting with each other, the candidate-matrix reselection processor 212 controls the candidate matrix selector 111 so as to reselect the block matrix 160 to be used for specifying cell IDs.

Detailed operations of the cell-ID conflict detector 211 and the candidate-matrix reselection processor 212 are described in conjunction with an operation example below.

(2-2-2) Block Diagram of UE

A basic configuration of the UE 400 according to the second embodiment will be described next with reference to FIG. 9. FIG. 9 is a block diagram illustrating one example of the basic configuration of the UE 400 according to the second embodiment.

Figure 9:
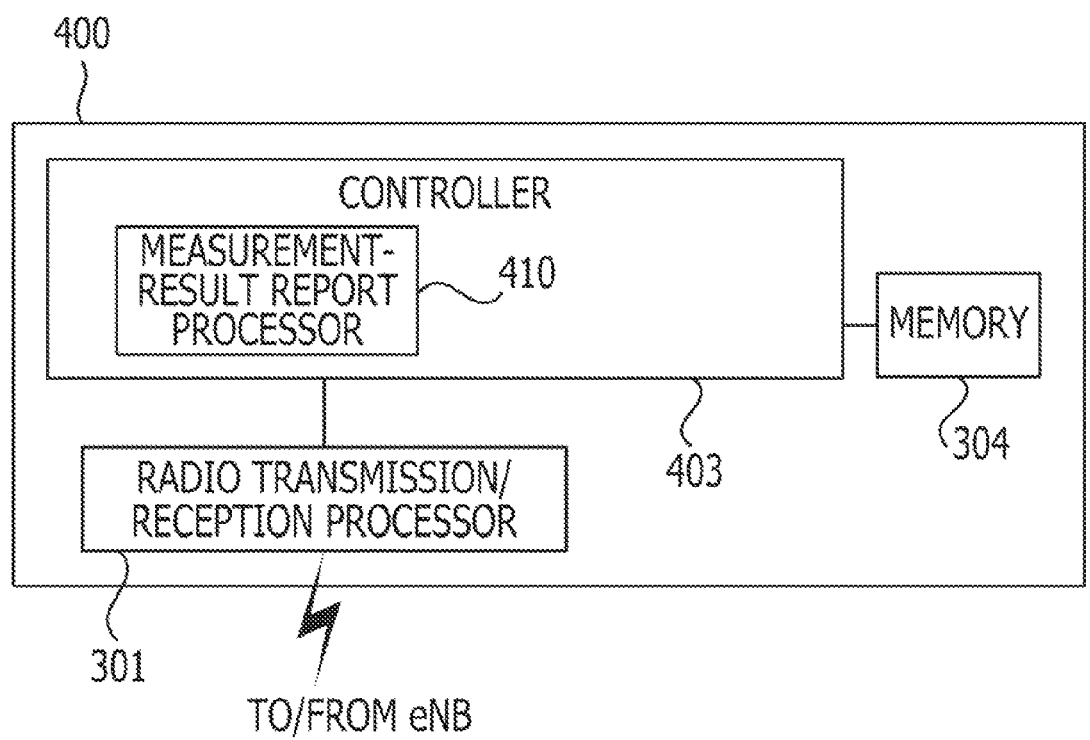
FIG. 9 is a block diagram illustrating a basic configuration of UE according to the second embodiment.

As illustrated in FIG. 9, the UE 400 includes a radio transmission/reception processor 301, a controller 403, and a memory 304, as in the UE 300 according to the first embodiment.

In the UE 400 according to the second embodiment, the controller 403 has, as a logical or functional processing block, a measurement-result report processor 410. The processing block may be realized, for example, as operations of one or some programs of firmware that defines the operation of the controller 403 or as operations of a program that is independent from the firmware. Alternatively, the measurement-result report processor 410 may be realized as a single circuit that is independent from the controller 403.

The measurement-result report processor 410 creates the message indicating the radio-quality measurement result and transmits the message to the eNB 200 via the radio transmission/reception processor 301.

(2-3) FIRST OPERATION EXAMPLE

Figure 10:
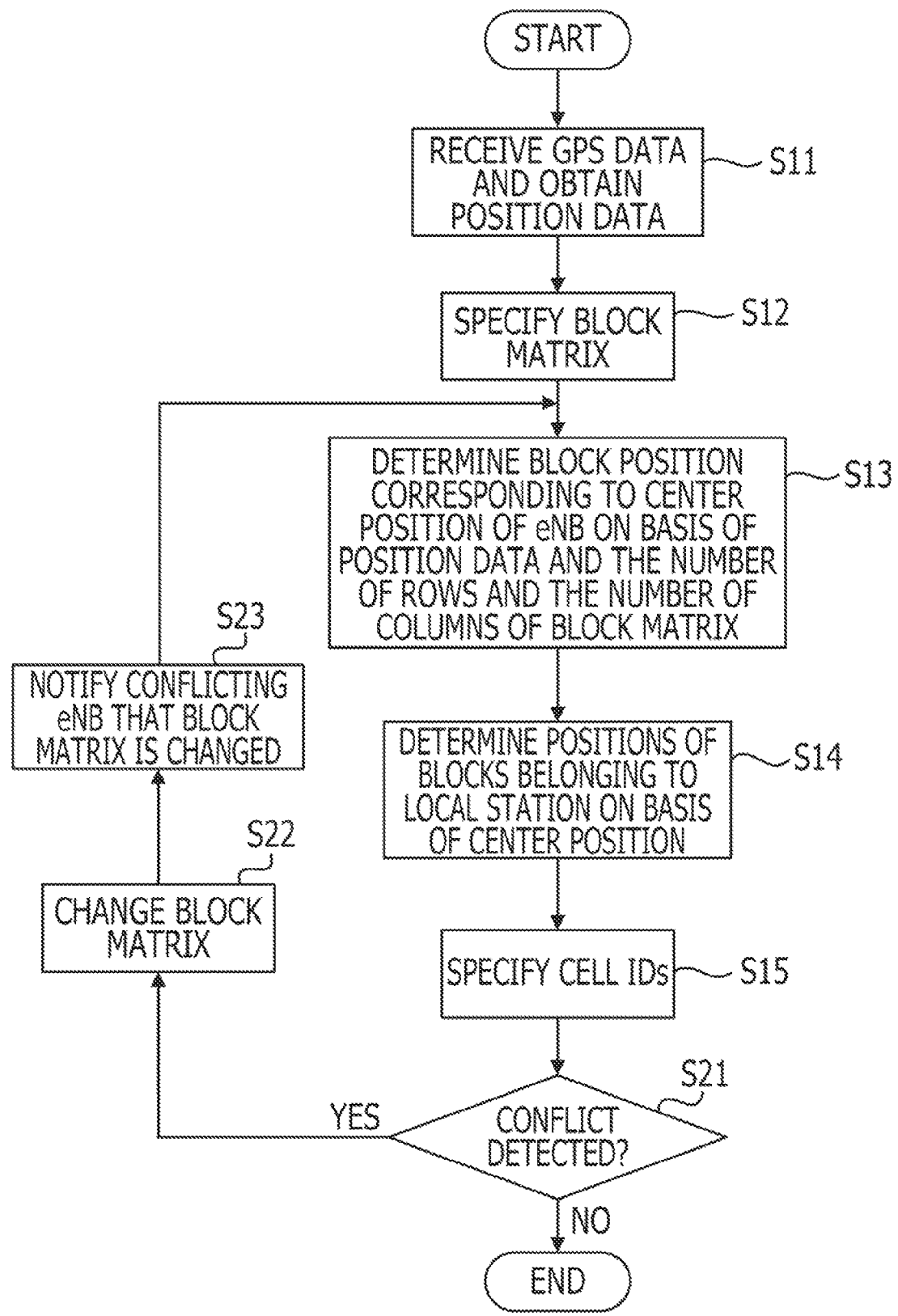
FIG. 10 is a flowchart illustrating a flow of a first operation example of the eNB included in the radio communication system according to the second embodiment.

A first operation example (e.g., cell-ID specifying operation) of the eNB 200 included in the radio communication system 2 according to the second embodiment will be described next with reference to FIG. 10. FIG. 10 is a flowchart illustrating a flow of the first operation example of the eNB 200 included in the radio communication device 2 according to the second embodiment.

As illustrated in FIG. 10, by performing the processing in operations S11 to S15 described above, the eNB 200 specifies cell IDs to be used thereby. Subsequently, the eNB 200 uses the cell IDs specified in operation S15 to perform radio communication with the UE 300.

Thereafter, in operation S21, the cell-ID conflict detector 211 included in the eNB 200 determines whether or not the cell ID is conflicting with the cell ID of another eNB 200, on the basis of the message transmitted from the UE 400. More specifically, the measurement-result report processor 410 included in the UE 400 periodically or irregularly transmits the message indicating the radio-quality measurement result (a measurement report) to the eNB 200. The message includes the base station ID of the eNB 200 with which the UE 400 is currently communicating and the cell ID of the cell 250 covered by the eNB 200. When the cell ID included in the received message is the same as the cell ID used by the eNB 200 and the base station ID included in the received message is different from the base station ID of the eNB 200, the cell-ID conflict detector 211 determines that the cell ID is conflicting with the cell ID of the other eNB 200. When the cell ID included in the received message is the different from the cell ID used by the eNB 200 or the base station ID included in the received message is the same as the base station ID of the eNB 200, the cell-ID conflict detector 211 determines that the cell ID is not conflicting with the cell ID of the other eNB 200.

When the determination in operation S21 indicates that the cell ID is not conflicting with the cell ID of the other eNB 200 (i.e., No), the cell-ID specifying operation ends. Alternatively, the operation of determining whether or not the cell ID is conflicting with the cell ID of the other eNB 200 may be continuously performed.

On the other hand, when the determination in operation S21 indicates that the cell ID is conflicting with the cell ID of the other eNB 200 (i.e., Yes), the process proceeds to operation S22. In operation S22, the candidate-matrix reselection processor 212 included in the eNB 200 controls the candidate matrix selector 111 so as to reselect the block matrix 160 to be used for specifying cell IDs. As a result, the candidate matrix selector 111 changes the block matrix 160, used for specifying cell IDs, from the block matrix 160 specified in operation S11 to a new block matrix 160.

In order to change the block matrix 160, it is preferable that multiple types of block matrix 160 be pre-specified. More specifically, for example, it is preferable that a parameter for identifying a first type of block matrix 160, a parameter for identifying a second type of block matrix 160, . . . , and a parameter for identifying an nth type of block matrix 160 (where n is an integer of 2 or more) be stored in the memory 104 or the like as parameters for operation of the eNB 200.

The block matrices 160 are assigned IDs that are different from each other. More specifically, the cell IDs assigned to the blocks 170 included in the first type of block matrix 160, the cell IDs assigned to the blocks 170 included in the second type of block matrix 160, . . . , and the cell IDs assigned to the blocks 170 included in the nth type of block matrix 160 are different from each other. It is also preferable that the number ("n" noted above) of types of block matrix 160 be a number that permits overlapping of the cells 250. For example, when overlapping of k cells 250 is permitted in the radio communication system 2, it is preferable that the number ("n" noted above) of types of block matrix 160 be equal to k. With this arrangement, even when overlapping of the k cells 250 is permitted, cell IDs that do not overlap each other can be specified with respect to the k cells 250.

In operation S23, the candidate-matrix reselection processor 212 issues, to the eNB 200 whose cell ID was determined in operation S21 as being conflicting, a notification indicating that the block matrix 160 to be used is changed. More specifically, the candidate-matrix reselection processor 212 transmits, to the conflicting eNB 200 via the radio transmission/reception processor 101, a message (e.g., a cell-ID collision indication) including information that allows identification of the changed block matrix 160. The candidate-matrix reselection processor 212 also receives, as a response to the message, a message (e.g., a cell-ID collision response) from the conflicting eNB 200 via the radio transmission/reception processor 101.

Subsequently, the eNB 200 performs the processing in operations S13 to S15 by using the changed block matrix 160. As a result, the eNB 200 identifies new cell IDs.

Figure 11A:
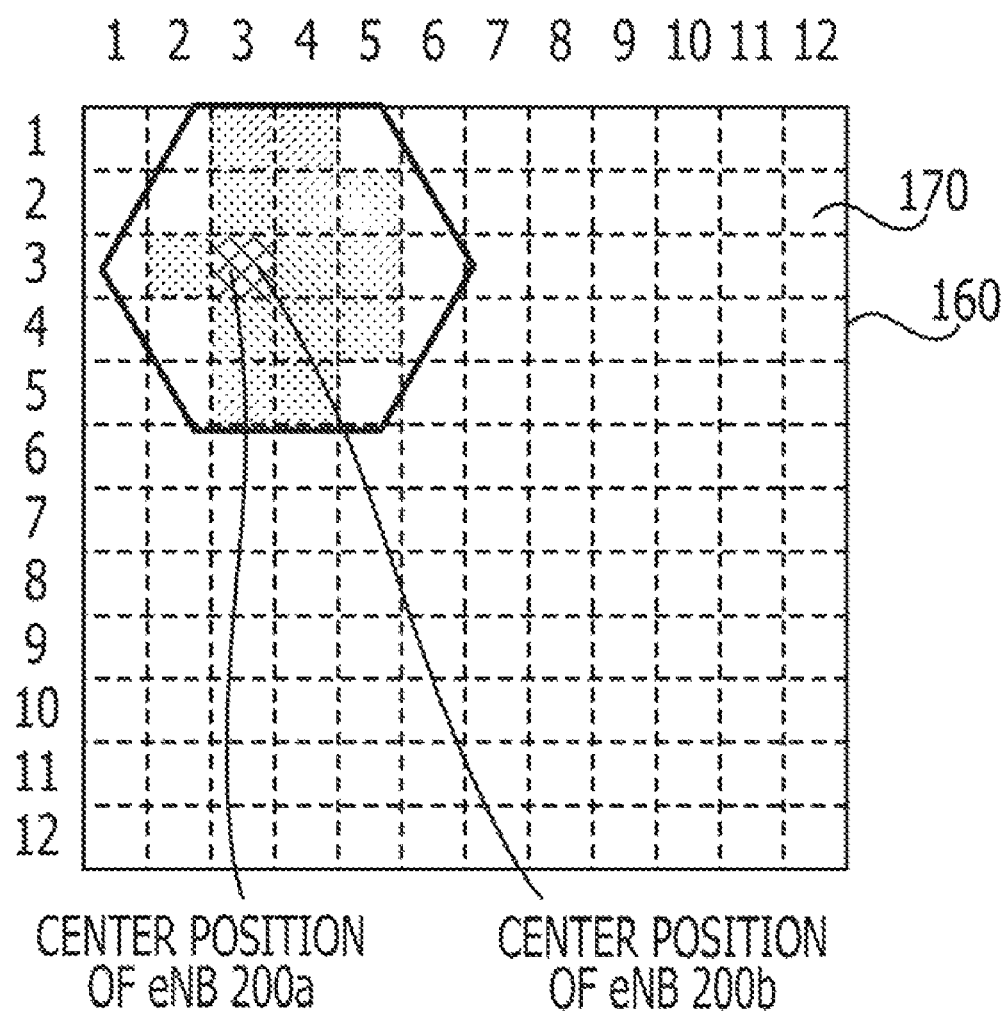

The cell-ID specifying operation described above will be described in more detail with reference to an embodiment illustrated in FIGS. 11A to 11C. FIGS. 11A to 11C are plan views each illustrating, in a block matrix 160, a specific cell-ID specifying operation according to the first operation example.

An eNB 200a and an eNB 200b are assumed to be arranged at substantially the same position, as illustrated in FIG. 11A. In this case, the block 170 corresponding to the position of the eNB 200a and the block 170 corresponding to the position of the eNB 200b match each other. Thus, if cell IDs are specified using one block matrix 160, the cell IDs used by the eNB 200a and the cell IDs used by the eNB 200b match each other. A description will be given below of a case in which, under such a situation, the eNB 200a determines that cell IDs are conflicting with each other on the basis of the radio-quality measurement result message transmitted from the UE 400.

When the cell-ID conflict detector 211 included in the eNB 200a determines that the cell IDs are conflicting with each other on the basis of the radio-quality determination result message transmitted from the UE 400, the candidate-matrix reselection processor 212 included in the eNB 200a changes the block matrix 160, used for specifying cell IDs, from a block matrix 160a used thus far (see FIG. 11B) to a new block matrix 160b (see FIG. 11C).

Blocks 170b in the new block matrix 160b are assigned cell IDs that are different from the cell IDs assigned to the blocks 170a in the block matrix 160a used thus far. In the examples illustrated in FIGS. 11B and 11C, cell IDs 1 to 144 are assigned to the blocks 170a in the block matrix 160a and cell IDs 145 to 288 are assigned to the blocks 170b in the block matrix 160b.

Thereafter, the eNB 100a uses the block matrix 160b to specify cell IDs and the eNB 100b uses the block matrix 160a to specify cell IDs. Thus, the cell IDs of the eNB 200a and the eNB 200b do not conflict with each other. Thus, according to the first operation example, even when multiple cells 250 overlap each other geographically, cell IDs that are different from each other can be specified for the cells 250.

In addition, according to the first operation example, the eNB 200 that has changed the block matrix 160 (this eNB 200 will hereinafter be referred to as "eNB 200a" for simplicity of description) notifies the conflicting eNB 200 (hereinafter be referred to as "eNB 200b" for simplicity of description) that the block matrix 160 is changed. Thus, the conflicting eNB 200b can also recognize the type of block matrix 160 used by the eNB 200a, in addition to the type of block matrix 160 used by the eNB 200b. If the notification indicating that the block matrix 160 is changed is not issued from the eNB 200a to the eNB 200b, the conflicting eNB 200b may not recognize the type of block matrix 160 used by the eNB 200a. Thus, if the eNB 200b determines that the cell ID is conflicting with the cell ID of another eNB (e.g., an eNB 200c), the eNB 200b changes the block matrix 160 to a block matrix 160 other than one currently used by the eNB 200b. If, however, the changed block matrix 160 becomes the same as the block matrix 160 used by the eNB 200a, the cell IDs of the eNB 200a and the cell IDs of the eNB 200b conflict with each other again. Accordingly, according to the first operation example, if the eNB 200b determines that the cell ID is conflicting with the cell ID of another eNB 200c, the eNB 200b can change the block matrix 160 to a block matrix 160 other than ones currently used by the eNB 200b and the eNB 200a. Thus, a case in which cell IDs conflict with each other again as a result of the change of the block matrix 160 rarely occurs or does not occur at all.

(2-4) SECOND OPERATION EXAMPLE

A second operation example (e.g., cell-ID specifying operation) of the eNB 200 included in the radio communication system 2 according to the second embodiment will be described next with reference to FIG. 12. FIG. 12 is a flowchart illustrating a flow of the second operation example of the eNB 200 included in the radio communication system 2 according to the second embodiment.

The description in the first operation example has been given of a case in which, when the cells 250 of two eNBs 200 overlap each other, only one of the eNBs 200 detects the conflict (i.e., determines that the conflict is present). However, when the cells 250 of two eNBs 200 overlap each other, it can also be presumed that both of the eNBs 200 substantially simultaneously detect the conflict. In order to deal with such a situation, an operation for specifying cell IDs when both of two eNBs 200 substantially simultaneously detect the conflict is performed in the second operation example.

As illustrated in FIG. 12, by performing the processing in operations S11 to S15 described above, the eNB 200 (hereinafter referred to as "eNB 200a"for simplicity of description) specifies cell IDs to be used thereby. Subsequently, the eNB 200a uses the cell IDs specified in operation S15 to perform radio communication with the UE 300.

Thereafter, in operation S21, the cell-ID conflict detector 211 included in the eNB 200a determines whether or not the cell-ID is conflicting with the cell ID of another eNB 200 (hereinafter referred to as "eNB 200b" for simplicity of description), on the basis of the message transmitted from the UE 400.

When the determination in operation S21 indicates that the cell IDs are not conflicting between the eNB 200a and the eNB 200b (i.e., No), the eNB 200a ends the cell-ID specifying operation. Alternatively, the eNB 200a may continuously perform an operation of determining whether or not the cell ID is conflicting with the cell ID of the eNB 200b.

On the other hand, when the determination in operation S21 indicates that the cell IDs are conflicting between the eNB 200a and the eNB 200b (i.e., Yes), the process proceeds to operation S31. In operation S31, the cell-ID conflict detector 211 included in the eNB 200a transmits a message indicating that the cell IDs are conflicting with each other to the eNB 200b via the radio transmission/reception processor 101. The message may be transmitted using, for example, an X2 interface or the like that defines a communication with the eNB 200.

In operation S32, the cell-ID conflict detector 211 included in the eNB 200a determines whether or not a message indicating that the cell IDs are conflicting with each other is received from the eNB 200b to which the message was transmitted in operation S31. In other words, the cell-ID conflict detector 211 included in the eNB 200a determines whether or not a message indicating that the cell IDs are conflicting with each other is transmitted from the eNB 200b to which the eNB 200a transmitted the message in operation S31. That is, in operation S32, a determination is made as to whether or not both of the eNB 200a and the eNB 200b substantially simultaneously detected a cell-ID conflict.

When the determination in operation S32 indicates that the message indicating that the cell IDs are conflicting is not received (i.e., No), it can be presumed that only the eNB 200a has detected the cell-ID conflict and the eNB 200b has not detected the cell-ID conflict. Thus, in this case, in operation S22, the eNB 200a changes the block matrix 160 to be used for specifying cell IDs. In operation S23, the eNB 200a notifies the eNB 200b that the block matrix 160 to be used is changed. Subsequently, the eNB 200a performs the processing in operations S13 to S15 by using the changed block matrix 160. As a result, the eNB 200 specifies new cell IDs.

When the determination in operation S32 indicates that the message indicating that the cell IDs are conflicting is received (i.e., Yes), it can be presumed that both of the eNB 200a and the eNB 200b substantially simultaneously detected the cell-ID conflict. In this case, in operation S33, the cell-ID conflict detector 211 included in the eNB 200a determines, for example, whether or not the base station ID of the eNB 200a is larger than the base station ID of the eNB 200b, the latter base station ID being included in the message transmitted from the eNB 200b.

When the determination in operation S33 indicates that the base station ID of the eNB 200a is not larger than the base station ID of the eNB 200b (i.e., No), the process proceeds to operation S22. In operation S22, the eNB 200a changes the block matrix 160 to be used for specifying cell IDs. Further, in operation S23, the eNB 200a notifies the eNB 200b that the block matrix 160 to be used is changed. Subsequently, the eNB 200a performs the processing in operations S13 to S15 by using the changed block matrix 160. As a result, the eNB 200 specifies new cell IDs. That is, when the base station ID of the eNB 200a is not larger than the base station ID of the eNB 200b, the eNB 200a determines that the priority thereof is lower than the priority of the eNB 200b and thus changes the block matrix 160.

On the other hand, when the result of the determination in operation S33 indicates that the base station ID of the eNB 200a is larger than the base station ID of the eNB 200b (i.e., Yes), the eNB 200a ends the processing without changing the block matrix 160. In this case, the eNB 200b changes the block matrix 160. That is, when the base station ID of the eNB 200a is larger than the base station ID of the eNB 200b, the eNB 200a determines that the priority thereof is higher than the priority of the eNB 200b and does not change the block matrix 160 (in other words, causes the eNB 200b to change the block matrix 160).

In the second operation example, even when multiple eNBs 200 substantially simultaneously detect the conflict, the cell IDs can be appropriately specified without contradiction between the multiple eNBs 200.

The above description has been given of an example in which the base station IDs of the eNBs 200 are used in order to determine the priorities for determining whether or not the block matrix 160 is to be changed. However, for example, various identification numbers, parameters, or variables that allow the eNBs 200 to be uniquely identified, as well as the base station IDs, may also be used to determine the priorities.

The present invention is not limited to the above-described embodiments. Various changes and modifications can be made thereto as appropriate without departing from the spirit and scope of the present invention which are construed from the appended claims and the entire description herein, and a radio base station and a cell-identifier specifying method to which such changes or modifications are made are also encompassed by the technical scope of the present invention.

All examples and conditional language recited herein are intended for pedagogical purposes to aid the reader in understanding the invention and the concepts contributed by the inventor to furthering the art, and are to be construed as being without limitation to such specifically recited examples and condition. Although the embodiment of the present inventions have been described in detail, it should be understood that the various changes, substitutions, and alternations could be made hereto without departing from the spirit and scope of the invention.

What is claimed is:

1. A radio base station comprising:
    a first obtaining device to obtain position information for locating a position of a local station;
    a second obtaining device to obtain a matrix that includes blocks, each block representing an area with which a cell identifier is associated, and that covers a cell coverage of the local station and a cell coverage in which uses cell identifiers that are different from the cell identifier of the local station; and
    a specifying device to specify the cell identifiers associated with the blocks included in the cell coverage of the local station, on a basis of the position of the local station located by the position information and the matrix.

2. The radio base station according to claim 1, wherein the specifying device specifies one block which corresponds to the local station position located by the position information and specifies the cell identifier associated with at least one of the blocks included in the cell coverage of the local station, the one block being located at a center of the at least one of the blocks.

3. The radio base station according to claim 2, wherein the specifying device specifies the one block by using remainders obtained by dividing a position parameter indicating the position of the local station located by the position information by a number of rows and a number of columns of the blocks included in the matrix.

4. The radio base station according to claim 1, wherein the matrix covers the cell coverage of the local station and the cell coverage of at least one other radio base station adjacent to the local station.

5. The radio base station according to claim 1, further comprising a determining device to determine whether or not another radio base station that covers a cell coverage overlapping the cell coverage of the local station exists;
    wherein when the determining device determines that another radio base station that covers a cell coverage overlapping the cell coverage of the local station exists, the second obtaining device obtains a matrix that is other than the matrix used by the another radio base station and that is one of matrices assigned the cell identifiers that are different from each other and the specifying device specifies the cell identifiers on a basis of the other matrix.

6. The radio base station according to claim 5, further comprising a notifying device to notify the another radio base station that the other matrix is changed.

7. The radio base station according to claim 5, wherein when the determining device determines that the another radio base station exists and a priority of the other base station is higher than a priority of the local station, the second obtaining device obtains the matrix that is other than the matrix used by the another radio base station and that is one of the matrices assigned the cell identifiers and the specifying device specifies the cell identifiers on the basis of the other matrix.

8. A cell-identifier specifying method for a radio base station, the method comprising:
    obtaining position information for locating a position of a local station;
    obtaining a matrix that includes blocks, each block representing an area with which a cell identifier is associated, and that covers a cell coverage of the local station and a cell coverage in which uses cell identifiers that are different from the cell identifier of the local station; and
    specifying the cell identifiers associated with the blocks included in the cell coverage of the local station, on a basis of the position of the local station located by the position information and the matrix.

9. The cell-identifier specifying method according to claim 8, wherein in the specifying, one block which corresponds to the position of the local station located by the position information is specified and the cell identifier associated with at least one of the blocks included in the cell coverage of the local station, the one block being located at a center of the at least one of the blocks, is specified.

10. The cell-identifier specifying method according to claim 9, wherein in the specifying, the one block is specified using remainders obtained by dividing a position parameter indicating the position of the local station located by the position information by a number of rows and a number of columns of the blocks included in the matrix.

11. The cell-identifier specifying method according to claim 8, wherein the matrix covers the cell coverage of the local station and the cell coverage of at least one other radio base station adjacent to the local station.

12. The cell-identifier specifying method according to claim 8, further comprising determining whether or not another radio base station that covers a cell coverage overlapping the cell coverage of the local station exists;
    wherein when it is determined that another radio base station that covers a cell coverage overlapping the cell coverage of the local station exists, a matrix that is other than the matrix used by the another radio base station and that is one of matrices assigned the cell identifiers that are different from each other is obtained in the matrix obtaining and the cell identifiers are specified in the specifying on a basis of the other matrix.

13. The cell-identifier specifying method according to claim 12, further comprising notifying the another radio base station that the other matrix is changed.

14. The cell-identifier specifying method according to claim 12, wherein when it is determined that the another radio base station exists and a priority of the another base station is higher than a priority of the local station, the matrix that is other than the matrix used by the another radio base station and that is one of the matrices assigned the cell identifiers is obtained in the matrix obtaining and the cell identifiers are specified in the specifying on the basis of the other matrix.

* * * * *